(12) United States Patent
Singer

(10) Patent No.: US 10,039,407 B2
(45) Date of Patent: *Aug. 7, 2018

(54) COFFEE DISPENSER

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,653

(22) Filed: Oct. 27, 2017

(65) Prior Publication Data

US 2018/0168384 A1 Jun. 21, 2018

Related U.S. Application Data

(63) Continuation of application No. 15/379,706, filed on Dec. 15, 2016, now Pat. No. 9,826,856.

(51) Int. Cl.
*A47J 31/40* (2006.01)
*A47J 31/00* (2006.01)
*A47J 31/41* (2006.01)
*A47J 31/44* (2006.01)

(52) U.S. Cl.
CPC ............ *A47J 31/002* (2013.01); *A47J 31/41* (2013.01); *A47J 31/4403* (2013.01); *A47J 31/4496* (2013.01)

(58) Field of Classification Search
CPC ...... A47J 31/002; A47J 31/41; A47J 31/4496; A47J 31/4403
USPC ................ 99/275, 280, 290, 286, 288, 300; 426/431, 580, 42
See application file for complete search history.

(56) References Cited

U.S. PATENT DOCUMENTS

| | | |
|---|---|---|
| 4,059,016 A | 11/1977 | Kitzinger et al. |
| 5,501,367 A | 3/1996 | Chigira |
| 9,826,856 B1 | 11/2017 | Singer |
| 2009/0302038 A1 | 12/2009 | Taggart et al. |
| 2011/0226343 A1 | 9/2011 | Novak et al. |
| 2013/0129885 A1 | 5/2013 | Doglioni Majer |
| 2014/0061237 A1 | 3/2014 | Hayakawa et al. |

*Primary Examiner* — Phuong Nguyen
(74) *Attorney, Agent, or Firm* — Stetina Brunda Garred and Brucker

(57) ABSTRACT

The coffee dispenser disclosed herein may serve a single serving of coffee. The coffee dispenser may have a mixing chamber that combines one or more liquid concentrates and heated water, and dispenses a single serving of coffee. The coffee dispenser may have a forth control to select the forth level of the serving of coffee dispensed. The liquid concentrate may be a coffee extract.

11 Claims, 5 Drawing Sheets

COFFEE DISPENSER

CROSS-REFERENCE TO RELATED APPLICATIONS

The present application is a continuation patent application of U.S. patent application Ser. No. 15/379,706 filed on Dec. 15, 2016, the entire contents of which are incorporated herein by reference.

STATEMENT RE: FEDERALLY SPONSORED RESEARCH/DEVELOPMENT

Not Applicable

BACKGROUND

The dispenser disclosed herein relates to an automated single cup coffee dispenser.

Today's coffee consumer desires both affordability and customization. Coffee shops offer the desired customization, but are expensive. Conversely, many home and office coffee makers can produce a pot of coffee relatively inexpensively, but offer no customization to each cup. This has led to single cup automated coffee dispensers for use in home and at the workplace. The typical version of these machines use small plastic cups which contain the ground coffee beans. There are certain deficiencies in current models of single cup automated coffee machines. For example, there are millions of plastic cups that re discarded everyday and fill up our landfills, and thus are not eco friendly.

Accordingly, there is a need in the art for an improved coffee dispenser.

BRIEF SUMMARY

Referring now to the drawings, a coffee dispenser for preparing coffee by mixing a liquid coffee extract and hot water is disclosed. The coffee dispenser may dispense a single serving of coffee. The coffee dispenser may have one or more ports for receiving one or more containers each having liquid coffee extract, flavoring and a creamer. These ports are in fluid communication with a mixing chamber or blending chamber which receives a single serving of liquid coffee extract and hot water as well as other flavors (e.g., flavors or creamers) desired by the consumer. The mixing chamber outputs the mixed ingredients to an outlet port valve into a cup below. One benefit of such a design is the elimination of single serving cups of coffee grounds, and the plastic waste associated with their use. The use of a coffee extract eliminates the need for a single serving cup of coffee grounds. A container of liquid coffee extract may contain from 10 to 300 servings, depending on the selected serving size. However, it is also contemplated that the container of liquid coffee extract may contain between 1 to 300 services. Further, by utilizing the liquid coffee extract, certain benefits may be achieved including but not limited to weight loss. Further, the chlorogenic acids in coffee extract can reduce blood pressure. For example, 140 mg of green coffee bean extract per day may reduce blood pressure. Finally, antioxidants found in coffee, which reduce free radicals in the body may reduce general cell damage and stress. Antioxidants, using the same process, may also reduce the proliferation of four kinds of cancer cells. Green coffee may be useful in preventing some types of cancer. Other coffee extracts may provide similar or additional benefits. By way of example and not limitation, these other extracts may include coffee bean extract, banana extracts, almond flavor extract, butter extract, cinnamon extract, coconut extract, hazelnut extract, maple extract, anise extract, lemon extract, lime extract, mint extract, orange extract, peppermint extract, raspberry extract, root beer extract, rum extract, strawberry extract or combinations thereof.

A coffee dispenser is disclosed for preparing coffee by mixing a liquid coffee extract and hot water to dispense a single serving of coffee. The dispenser may include a mixing chamber comprising a plurality of input connections and an output port. A flavor concentrate port may be connected to the mixing chamber via a first one of the plurality of input connections. A coffee concentrate port may be connected to the mixing chamber via a second one of the plurality of input connections. A cream concentrate port may be connected to the mixing chamber via a third one of the plurality of input connections. A water reservoir may be connected to the mixing chamber via a fourth input connection. The liquid coffee extract may be dispensed through the coffee concentrate port. The coffee dispenser may further include a plurality of valves. One valve may correspond to each of the concentrate ports, namely, the coffee concentrate port and the cream concentrate port. A pump may be connected in line between the water reservoir and the mixing chamber. A heater may be connected in line between the pump and the mixing chamber. The heater may heat the water being mixed with the liquid coffee extract to a sufficiently hot temperature to bring out the flavor of the liquid coffee extract. A computer may be connected to and control the valves, the pump, the heater and any one thereof.

The coffee dispenser may also include a cup size selector connected to the computer, and a froth level control connected to the computer. The computer may control the pump and the plurality of valves to correctly mix an amount of flavor concentrate, an amount of coffee concentrate, an amount of cream concentrate, and an amount of water from the water reservoir to correspond to a cup size selected by a user via the cup size selector. Alternatively, the computer may be used to control solely the heater. The amount of coffee extract, cream and optional flavor may be manually controlled by the user. The user may depress the containers which actuate a spring loaded valve to squirt or flow one serving per depression of the container.

Also disclosed is a dispenser in which the computer controls the valve corresponding to the cream concentrate port, heater and pump to create an amount of froth selected by the froth level control.

Further disclosed is a coffee dispenser where the cup size selector is a rotatable selector.

Further disclosed is a coffee dispenser which has a flavor concentrate, a coffee concentrate, and a cream concentrate located in containers connected to the coffee dispenser. The containers may be connected to the coffee dispenser via a threaded connection and the flavor concentrate, the coffee concentrate, and the cream concentrate may all in liquid form.

Further disclosed is a coffee dispenser in which the valves comprise a spike which pierces the containers.

Further disclosed is a coffee dispenser which an intake for the pump is located at the bottom of the water reservoir.

A method for manufacturing a coffee dispenser is disclosed. The method may include providing a mixing chamber comprising a plurality of input connections and an output port, connecting a flavor concentrate port to the mixing chamber via a first one of the plurality of input connections, and connecting a coffee concentrate port to the mixing chamber via a second one of the plurality of input connections. The method may further include connecting a cream concentrate port to the mixing chamber via a third one of the plurality of input connections, connecting a water reservoir to the mixing chamber via a fourth input connection, and providing a plurality of valves. One valve may be between each of the flavor concentrate port, coffee concentrate port, and cream concentrate port and the mixing chamber. The method may still further include connecting a pump in line between the water reservoir and the mixing chamber, connecting a heater in line between the pump and the mixing chamber, and connecting a computer to the valves, the pump and the heater, so that the computer controls the operation of the valves, the pump and the heater.

The disclosed method may further include connecting a cup size selector to the computer.

The disclosed method may further include a rotatable selector for the cup size selector.

The disclosed method may further include connecting a froth level control to the computer.

The disclosed method may further include a flavor concentrate container, a coffee concentrate container, and a cream concentrate container which may each be connected to their respective ports via a threaded connection.

The disclosed method may further include allowing the corresponding one the plurality of valves to be accessed through the threaded connection.

The disclosed method may further include valves each having a spike.

The coffee dispenser may include a mixing chamber comprising an output port, a flavor concentrate port connected to the mixing chamber, a coffee concentrate port connected to the mixing chamber, a cream concentrate port connected to the mixing chamber, and a water reservoir connected to the mixing chamber. The coffee dispenser may include a plurality of valves. One valve may correspond to each of the flavor concentrate port, the coffee concentrate port, and the cream concentrate port. A pump may be connected in line between the water reservoir and the mixing chamber. A may be heater connected in line between the pump and the mixing chamber. A computer may be connected to and control the valves, the pump, the heater or any one thereof.

The coffee dispenser further includes wherein the mixing chamber mixes a liquid flavor concentrate, a liquid coffee concentrate, a liquid cream concentrate, and water to produce a serving of coffee.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
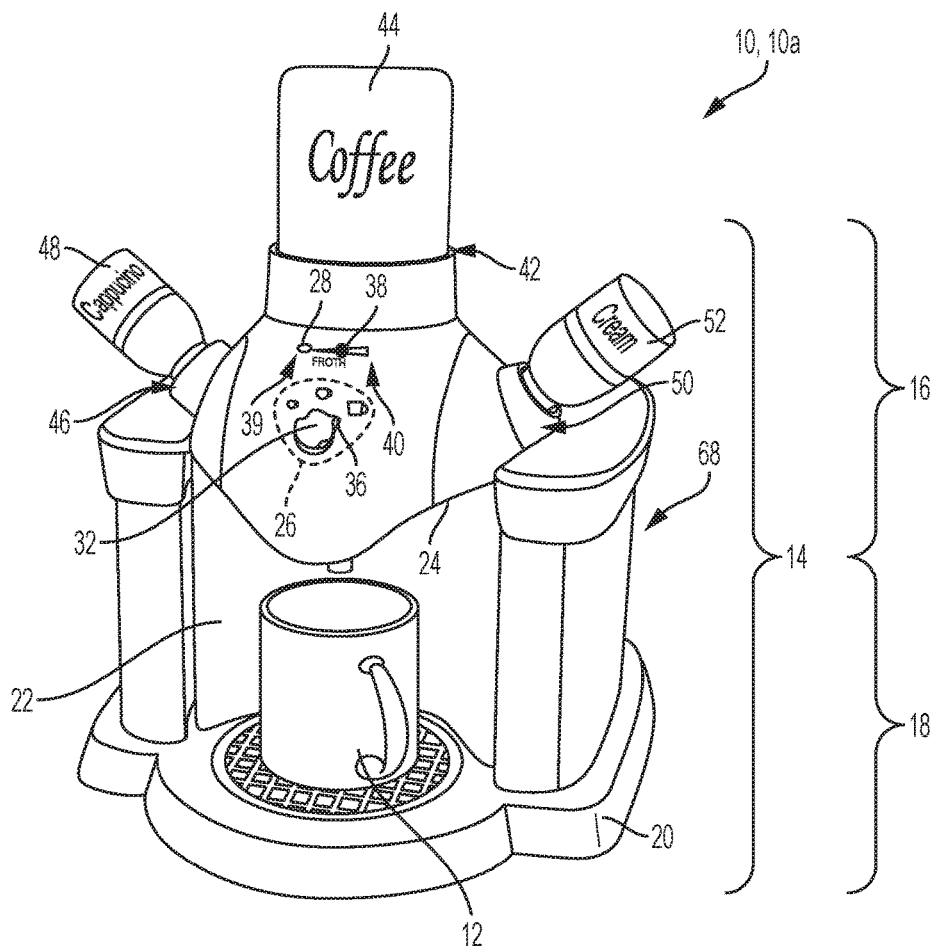
FIG. 1 illustrates a perspective view of a coffee dispenser.

Referring now to the drawings, a coffee dispenser 10 for preparing coffee by mixing a liquid coffee extract and hot water is disclosed. The coffee dispenser 10 may dispense a single serving of coffee. The coffee dispenser 10 may have one or more ports for receiving a container having liquid coffee extract, flavoring and a creamer. These ports may be in fluid communication with a mixing chamber or blending chamber 88 (see FIGS. 4 and 5) which may receive a single serving of liquid coffee extract and hot water. The mixing chamber 88 may also optionally receive other flavors desired by the consumer. The mixing chamber 88 outputs the mixed ingredients to an outlet port valve 92 (see FIG. 5) into a cup 12 below. One benefit of such a design is the elimination of single serving cups used to store and deliver coffee grounds to consumers, and the plastic waste associated with their use. A container of liquid coffee extract may contain from 50 to 300 servings, depending on the selected serving size. Although the preferred embodiment utilizes a large container that can hold multiple servings, it is also contemplated that the container may store and deliver a single serving of coffee extract. In this regard, the container of liquid coffee extract may contain between 1 to 300 servings depending on the selected serving size. Further, by utilizing the liquid coffee extract, certain benefits may be achieved including but not limited to weight loss. Further, the chlorogenic acids in coffee extract can reduce blood pressure. by way of example and not limitation, 140 mg of green coffee bean extract per day may reduce blood pressure. Finally, antioxidants found in coffee, which reduce free radicals in the body may reduce general cell damage and stress. Antioxidants, using the same process, may also reduce the proliferation of four kinds of cancer cells. Green coffee may be useful in preventing some types of cancer. Other coffee extracts may provide similar or additional benefits.

Referring now to FIG. 1, a coffee dispenser 10, for dispensing a single serving of coffee 12 is shown. The coffee dispenser 10 may include a housing 14 with an upper portion 16 and a lower portion 18. The lower portion 18 may be supported by a base 20 and may be defined by an arcuate wall 22 which supports the upper portion 16. The upper portion 16 may have a flat side 24 that rests on top of the arcuate wall 22. Two controls, a serving size selector 26 and a froth level control 28 may be located on an exterior surface 30 of the upper portion 16 of the housing 14. A water reservoir 68 may surround the lower portion 18 and rests on the base 20.

As shown, the cup size selector 26 may be defined by a rotatable knob 32 and two or more cup size icons 34. In FIG. 1, three cup size icons 34 are shown for small, medium and large. The knob includes an indicator 36, which points to the cup size icon 34 that is currently selected by the serving size selector 26. Instead of a rotatable knob 32, the serving size selector 26 may be a three button system, with one button for each of the cup sizes. Alternatively, the serving size selector may be integrated in to a touch panel control. In a further alternative, the serving size selector may be a toggle control in combination with an indicator or display. By way of example and not limitation, there may be three LED lights, one for each of the possible size selections. Also, instead of LED lights, a display may be provided which shows the selected cup size, either via a number or an icon, as a user toggles through the possible cup sizes.

The froth level control 28 may be control by a horizontal slider 38. The horizontal slider 38 may move from a first end 39 of the slider's range of motion to a second end 40 of the slider's range of motion. The first end may correspond to a minimal amount of froth, and the second end may correspond to a maximum amount of froth or vice versa. The slider may be positioned at any number of positions between the two ends.

Figure 2:
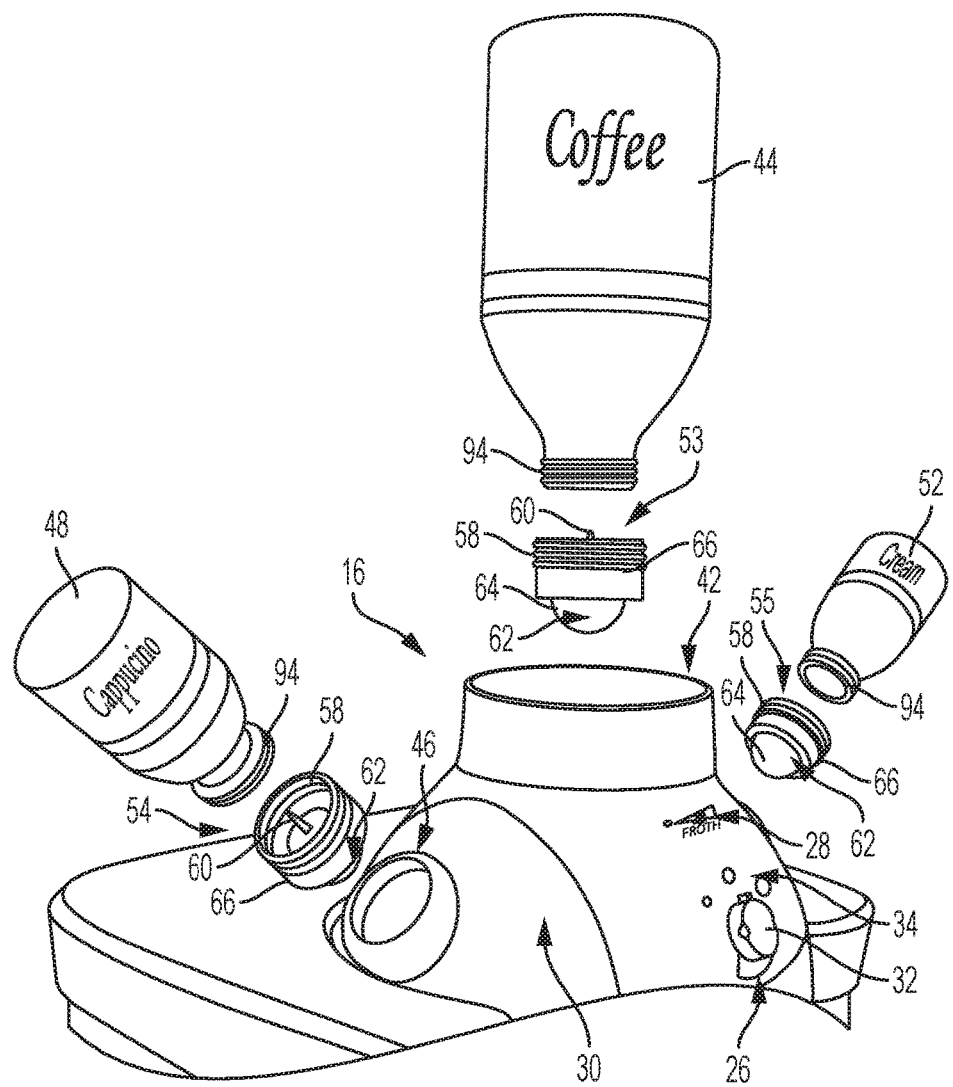
FIG. 2 illustrates an exploded view of the coffee dispenser and supply containers shown in FIG. 1.
Figure 3:
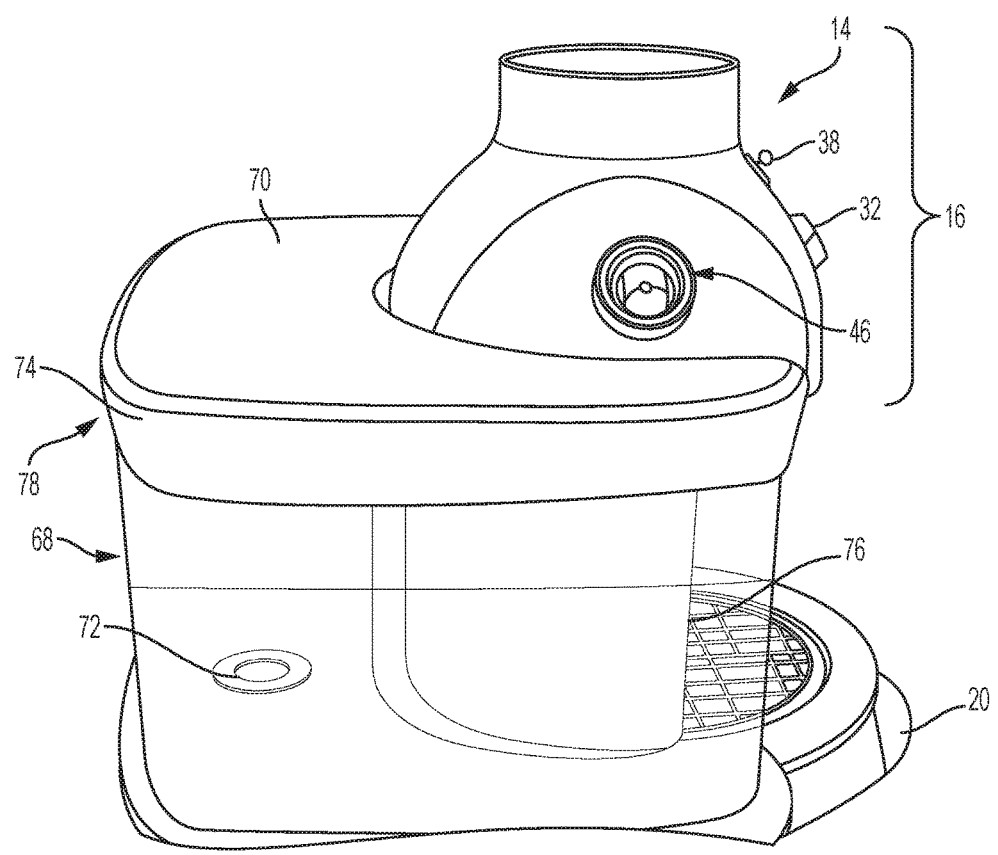
FIG. 3 illustrates a side view of the coffee dispenser without the supply containers attached.

The upper portion 16 may have three ports. A coffee concentrate port 42 may also be disposed on the upper portion 16. The coffee concentrate port 42 may have a larger circumference than the other two ports in order to accommodate a correspondingly sized coffee concentrate container 44. A flavor concentrate port 46 may be disposed on a left side of the coffee concentrate port 42. The flavor concentrate port 46 may accept a correspondingly sized flavor concentrate container 48. On a right side of the upper portion 16, a cream concentrate port 50 may be disposed. The cream concentrate port 50 may accept a correspondingly sized cream concentrate container 52. Although the port 42 have been described as having a different size compared to ports 46, 50, it is also contemplated that the ports 42, 46, 50 may be all the same size, or each of the ports 42, 46, 50 may be a different size from each other. Each of the containers may contain a liquid concentrate. The coffee concentrate may be an extract of a coffee bean. The cream concentrate may be a de-hydrated dairy product, and the flavor concentrate may be a liquid formulated to impart the flavor of a specified coffee beverage, such as cappuccino, mocha, espresso, or other flavors. As shown in FIG. 2, the ports 42, 46, 50 may use a threaded connection. However, other attachment methods are also contemplated. By way of example and not limitation, the ports 42, 46, 50 may use a friction connection or a twist and lock connection, or a detent connection. The ports 42, 46, 50 may be located in other areas on the upper portion on elsewhere on the coffee dispenser 10. The ports and the containers that hold the liquid flavors (i.e. coffee extract, flavor, creamer) may be disposed above the mixing chamber 88 so that the liquid may flow into the mixing chamber 88 by way of gravity. Other means of flowing the liquid flavors into the mixing chamber 88 are also contemplated including but not limited to providing a pump that actively forces the liquid flavor into the mixing chamber. In this case, the courts and the containers that holds the liquid flavors may be disposed below the mixing chamber 88.

As shown in FIG. 2, the ports may further include a valve 53, 54, 55. Each of the coffee port valve 53, flavor port valve 54, and cream port valve 55 may include a connection portion 58, a spike 60, and a valve portion 62. The connection portion 58 may have a thread, corresponding with a thread 94 on the coffee concentrate container 44, flavor concentrate container 48, and cream concentrate container 52. The valve portion 62 may include a spring-biased valve 64, and a sealing element 66. The spring-biased valve 64 may be biased closed by and may seal against the sealing element 66. The sealing element 66 may be made of rubber or another elastomeric compound. The spring biased valve 64 may return to its original position once displaced. The valve 64 allows fluid to flow through the valve 64 when displaced. It is also contemplated that the valve may be, for example, a ball valve, or a butterfly valve, or a needle valve, or any other valve that offers the required control while allowing sufficient flow. The valve 64 may be displaced either through an actuator controlled by the computer or by manually pressing the container downward. By way of example and not limitation, the user may press any one of the containers 44, 48, 52 once for a single serving of liquid contained in the containers 44, 48, 52. If additional servings of the liquid are desired, the user may depress any one of the containers 44, 48, 52 additional times.

The water reservoir 68 may surround the lower portion 18 of the housing 14. A bottom of the water reservoir may also rest on the base 20. The water reservoir 68 may be generally U-shaped along its horizontal cross section. The water reservoir 68 may have an open top. The open top of the U-shape may be sufficiently wide to allow the water reservoir to surround the housing 14 on three sides. The water reservoir 68 may be fabricated from a transparent material in order to allow a user to observe the water level therein, and a lid 70, which is shown as being opaque. Removal of the lid 70 allows a user to fill the water reservoir 68 with water. The water reservoir 68 interfaces with the base 20 at an intake 72 formed in the top of the base 20, and located at a position on the base near the center-bottom of the water reservoir 68. The lid 70 may fits under the flavor concentrate port 46 and the cream concentrate port 50 as the ports extend outward from the upper portion 16 of the housing 14. This configuration gives additional stability to the water reservoir 68 by preventing vertical movement of the water reservoir 68 once the water reservoir 68 is installed in the coffee dispenser 10.

It is contemplated that the water reservoir 68 may be merely translucent, or may be opaque and have a transparent window to allow a user to gauge the water level in the container. The lid 70 may be translucent or transparent to allow a user to more easily gauge the water level. The lid 70 may have sides 74 which extend over the corresponding sides 76 of the water reservoir 68 at an open end 78 of the water reservoir 68. The lid 70 may include a sealing strip (not shown), made from rubber or a similar elastomer, which is located on an interior surface of the sides 74 of the lid 70, and extends inwardly to seal against the sides of the water reservoir 68. It is also contemplated that the sides 74 of the lid 70 extend in to an interior of the water reservoir 68 and include the sealing strip for sealing on an exterior surface of the sides 74 of the lid 70. In this configuration, the sealing strip extends outwardly, and seals against an interior surface of the sides 76 of the container 69 near the open end.

Figure 4:
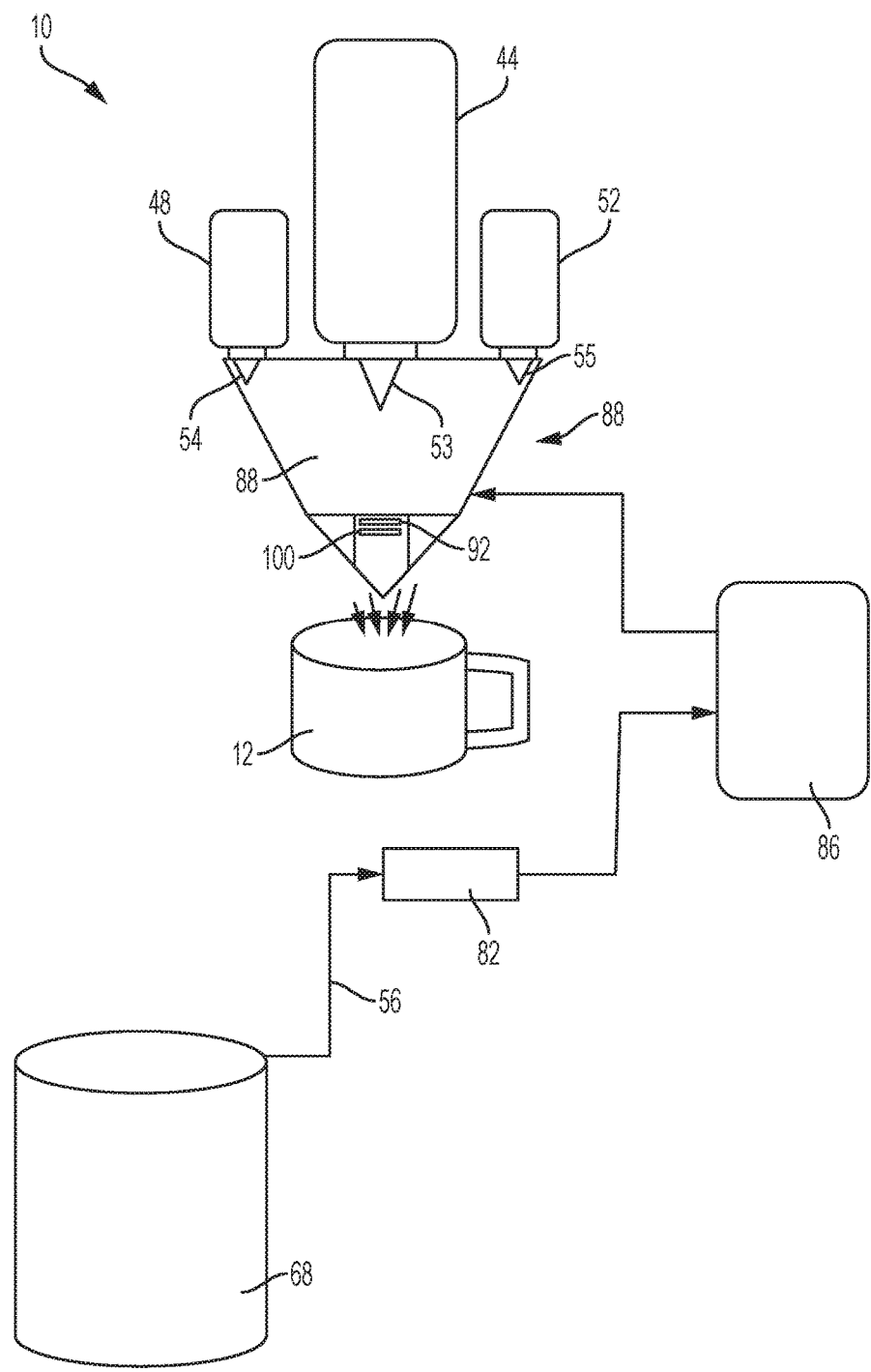
FIG. 4 illustrates a schematic diagram of the operative parts of the coffee dispenser shown in FIG. 1.
Figure 5:
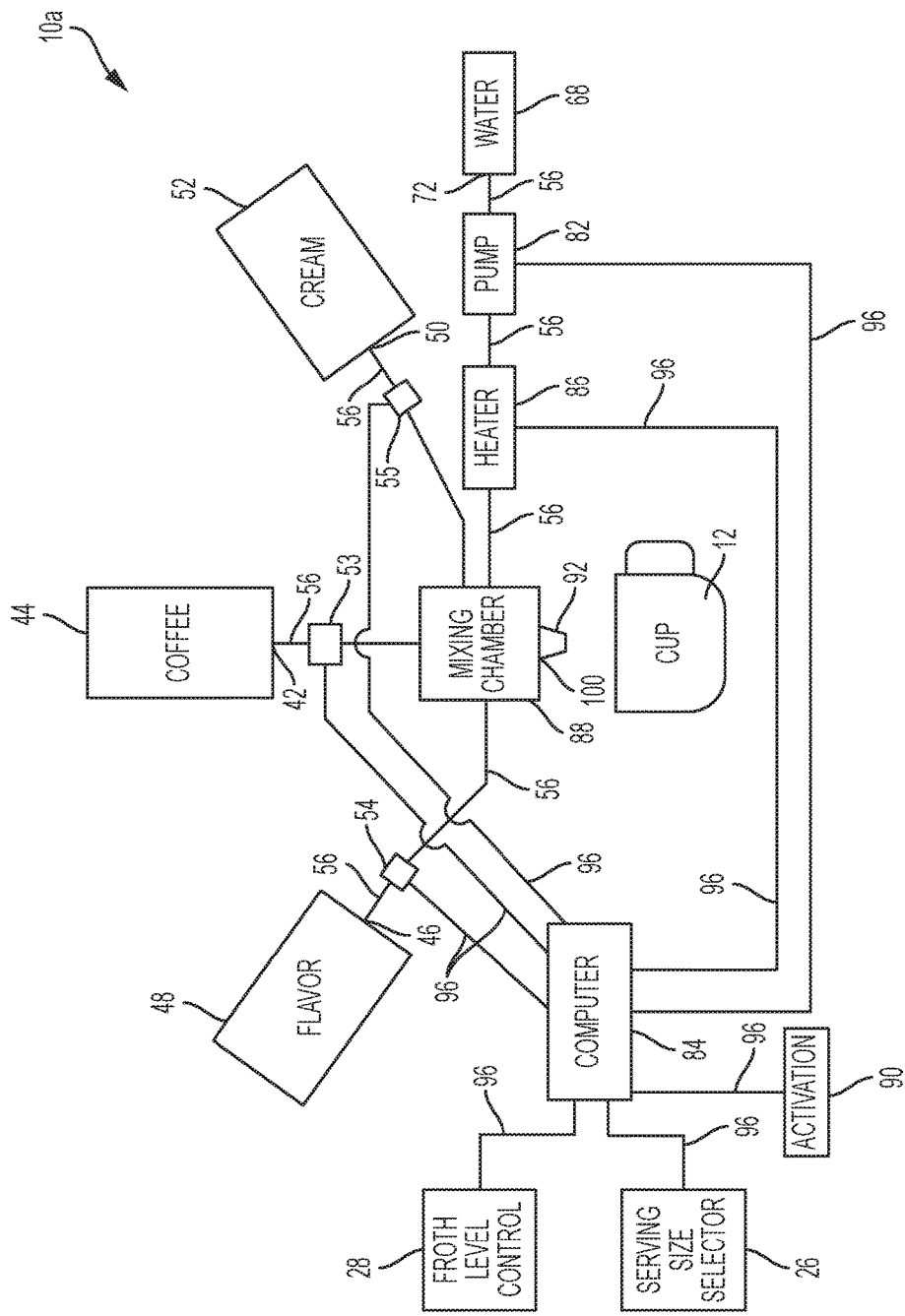
FIG. 5 illustrates a block diagram of the operative parts and controls of the coffee dispenser shown in FIG. 1.

The operating systems, including the operating internal components of the coffee dispenser 10, are shown schematically in FIGS. 4 and 5. The primary difference between the schematics provided in FIGS. 4 and 5 is that the dispenser 10 shown in FIG. 4 dispenses the concentrate manually, whereas the dispenser 10a shown in FIG. 5 dispenses the concentrate via a computer controlled valve.

The froth level control 28 and serving size selector 26 may be connected to the computer 84 via a wired 96 or wireless connection. The water reservoir 68 may be connected, through the intake 72, to a pump 82 via tubing or piping 56. The pump 82 may be electrically connected, either wired 96 or wirelessly, to the computer 84, which allows the computer 84 to turn the pump 82 on and off. The pump 82 may be connected to a boil chamber 86 via piping or tubing 56. The boil chamber is a heater for heating water. The boil chamber 86 may be connected to a mixing chamber 88 with piping or tubing 56. The boil chamber may be in communication with a computer either with a wire 96 or wirelessly. The computer 84 may turn the boil chamber 86 on and off in coordination with the pump 82. Based on the froth level control setting, the computer may set the temperature to which the boil chamber will heat the water therein. Thus, the water reservoir 68, pump 82 and heater 86 are connected in line to the mixing chamber 88, and the boil chamber 86 and pump 82 have individual electronic connections to the computer 84. The boil chamber is computer controlled but may be controlled through other non computerized means including but not limited to an electronic circuit.

The flavor concentrate ports 42, 46, 50 may be connected to the mixing chamber 88 with valves 53, 54, 55 placed in between to control the flow of concentrate. The flavor concentrate port 46 may be directly connected to the mixing chamber 88 or the flavor concentrate port may be connected to the mixing chamber via tubing or piping 56. As discussed above, a valve 54 may be disposed between the flavor concentrate port 46 and the mixing chamber. The flavor port valve may be operated manually or electrically connected to the computer 84 for operation. The coffee concentrate port 42 may be directly connected to the mixing chamber or the flavor concentrate port may be connected to the mixing chamber via tubing or piping. A coffee port valve 53 may be disposed between the coffee concentrate port and the mixing chamber. The coffee port valve may be operated manually or electrically connected to the computer for operation. The cream concentrate port 50 may be directly connected to the mixing chamber or the flavor concentrate port may be connected to the mixing chamber via tubing or piping. A cream port valve 55 may be disposed between the cream concentrate port and the mixing chamber. The cream port valve may be operated manually or electrically connected to the computer for operation.

In operation, a user may select the amount of froth desired in the serving of coffee 12 using the froth level control 28, and set the desired serving size using the serving size selector 26. In the embodiment shown in FIG. 4, the user may also operate the valves 53, 54, 55 by pressing on the corresponding concentrate container in order to move the container toward the corresponding valve. As the user applies enough force, the bias in the valve is overcome, and the valve operates to allow concentrate through the valve. Each press of the concentrate container operates the valve to allow a predetermined quantity of flavor concentrate, coffee concentrate, and cream concentrate to enter the mixing or blend chamber 88, where they come into contact, mixing to some degree. The concentrate containers 44, 48, 52 and corresponding valves are sized and shaped such that one press on the concentrate container corresponds with a small serving size set by the serving size selector. Two presses on either of the concentrate containers with introduce a predetermined quantity of concentrate to the mixing chamber corresponding to a medium serving of coffee. Three presses on either of the concentrate containers with introduce a predetermined quantity of concentrate to the mixing chamber corresponding to a large serving of coffee. However, each concentrate container may be pressed as many times as desired by a user to reach the user's desired flavor combination.

In the embodiment shown in FIG. 5, to begin the automated portion of the process of making a serving of coffee, the user presses the activation button or control 90. The activation button may be a push button function built in to the serving size selector rotatable knob 32. Alternatively, the activation button may be a separate button or non-latching switch. Once the activation control is operated by the user, the computer 84 may operate the pump 82 to draw water from the water reservoir 68 in to and through the boil chamber 86, which heats the water to a temperature determined by the froth level control and communicated to the boil chamber by the computer. The boil chamber may heat water to a temperature of 100 to 210 degrees Fahrenheit. Preferably, the boiler chamber heats water to a boiling temperature of 190° F. to 210° F. The boil chamber may steam water and send it to the mixing chamber at a temperature of 210 degrees Fahrenheit or more. Thus, the water that is introduced into the mixing chamber 88 may be at a temperature of about 100 degrees Fahrenheit to 210 degrees Fahrenheit in order to bring out the flavor of the liquid coffee extract. At temperatures of 190 degrees or more water will boil, and at 210 degrees or more, will change states to steam. As the water boils or changes phase from water to steam, the boil water or steam creates increasing degrees of froth, according to the froth setting selecting by the user via the froth level control, as described above.

After the boil chamber 86 heats the water, the pump 82 then moves the water to the mixing chamber 88. The mixing chamber may be shaped as an inverted truncated pyramid in order to facilitate, via the force of gravity, the movement of the serving of coffee in the mixing chamber to an outlet port valve. The inverted truncated pyramid configuration is shown schematically FIG. 4. However, the inverted truncated pyramid configuration may also be incorporated into the mixing chamber 88 shown in FIG. 5. After mixing, the outlet port valve at a bottom of the mixing chamber opens to allow the coffee to flow out of the mixing chamber and in to a cup below. The outlet port valve, may be, for example, a spring loaded pressure valve, or any other type of pressure valve which would open the valve when the proper pressure inside the mixing chamber is reached. The outlet port valve may also include a cooling element 100 which operates to cool liquid passing through the outlet port valve if the liquid is above a certain temperature such as 190 degrees Fahrenheit. The cooling element ensures that the liquid passing out of the outlet port valve is at or below the predetermined temperature. For example, the cooling element may ensure that the liquid passing out of the open valve between 170° F. and 190° F. if the heater or boiling chamber raises the liquid to a temperature that is too high (e.g. above 190° F.).

The embodiment shown in FIG. 5 operates in a very similar manner to the embodiment shown in FIG. 4 except for how the concentrate is added to the mixing chamber 88. In particular, the computer 84 is connected to flavor port valve 54, coffee port valve 53, and cream port valve 55. After operation of the froth level control 28 and serving size selector 26, and subsequent operation of the activation button 90 by a user, the computer using the selected serving size, operates the valves 53, 54, 55 to add a corresponding pre-determined amount of each type of concentrate based on a size indicated by the serving size selector 26. The remainder of the operation is the same as that described for the embodiment of FIG. 4, above.

Although the embodiment shown in the figures illustrates a dispenser that can dispense more than one serving, it is contemplated that the dispenser can be configured to be a single serve dispenser with or without a container 69. If no container is used, then the water for the coffee will be inserted into a container having an open top that is filled each time the user wants to make a single serving of coffee.

The above description is given by way of example, and not limitation. Given the above disclosure, one skilled in the art could devise variations that are within the scope and spirit of the invention disclosed herein, including various ways of configuring the stand. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A coffee dispenser for dispensing a single serving of coffee, the dispenser comprising:
   a mixing chamber;
   a coffee concentrate port having a liquid tight connection to the mixing chamber;

a liquid coffee concentrate in a coffee concentrate container attached to the coffee concentrate port wherein the coffee concentrate container is sufficiently large to hold a sufficient amount of liquid coffee concentrate for multiple servings of coffee, and a liquid tight channel formed from the coffee concentrate container, coffee concentrate port to the mixing chamber;

a water reservoir connected to the mixing chamber wherein a liquid tight channel formed from the water reservoir to the mixing chamber;

room temperature water disposed in the water reservoir;

a coffee port valve operable to allow a single serving of liquid coffee concentrate to flow from the coffee concentrate container, through the coffee concentrate port, and into the mixing chamber;

a pump;

a heater in liquid communication with the pump, and the heater and the pump connected in-line between the water reservoir and the mixing chamber in the liquid tight channel between the water reservoir and the mixing chamber; and a computer or electronic circuit for controlling the pump to draw, from the water reservoir, a batch of water corresponding to the single serving of coffee and control the heater to heat the batch of water drawn and move the heated batch of water for mixing with the liquid coffee concentrate.

2. The coffee dispenser of claim 1 further comprising a cup size selector connected to the computer wherein the pump is regulated based on a position of the cup size selector.

3. The dispenser of claim 2 wherein the computer controls the pump and the coffee port valve to correctly mix an amount of the liquid coffee concentrate and an amount of water from the water reservoir to correspond to a cup size selected by a user via the cup size selector.

4. The dispenser of claim 1 further comprising a froth level control connected to the computer wherein the heater regulates a water temperature of the water pumped through the heater based on a position of the froth level control.

5. The dispenser of claim 1, wherein the coffee concentrate container is attached to the coffee concentrate port via a threaded connection.

6. The dispenser of claim 1 wherein the coffee port valve comprises a spike which pierces the coffee concentrate container when the coffee concentrate container is initially attached to the coffee port valve.

7. A coffee dispenser for dispensing a single serving of coffee, the dispenser comprising:

a mixing chamber;

a coffee concentrate port directly connected to and in fluid communication with the mixing chamber;

a water reservoir connected to the mixing chamber;

a coffee port valve operable to allow liquid coffee concentrate to flow from a coffee concentrate container attachable to the coffee concentrate port, through the coffee port, and directly into the mixing chamber;

a pump;

a heater connected to the pump, and the pump and heater connected in line between the water reservoir and the mixing chamber; and a computer or electronic circuit for controlling the pump to draw, from the water reservoir, a batch of water corresponding to the single serving of coffee and move the batch of water to the mixing chamber and controlling the heater to heat the batch of water drawn by the pump.

8. The dispenser of claim 7 further comprising a froth level control by which a froth level may be selected by a user of the coffee dispenser, wherein the computer controls the heater to adjust a water temperature based on the selected froth level.

9. A coffee dispenser for dispensing a single serving of coffee, the dispenser comprising:

a mixing chamber;

a coffee concentrate port connected to and in fluid communication with the mixing chamber via a second fluid communication line connecting the coffee concentrate port and the mixing chamber;

a liquid coffee concentrate in a coffee concentrate container attached to the coffee concentrate port;

a water reservoir connected to the mixing chamber;

a coffee port valve operable to allow the liquid coffee concentrate to flow from the coffee concentrate container, through the attached coffee concentrate port, and into the mixing chamber via the second fluid communication line;

a pump connected in line between the water reservoir and the mixing chamber;

a heater connected in line between the pump and the mixing chamber; and a computer or electronic circuit for controlling the pump to draw, from the water reservoir, a batch of water corresponding to the single serving of coffee and move the batch of water to the mixing chamber and controlling the heater to heat the batch of water drawn by the pump;

wherein the entire contents of the mixing chamber is dispensed from an output port of the mixing chamber as the single serving of coffee.

10. The dispenser of claim 9 further comprising a froth level control by which a froth level of the single serving of coffee may be selected by a user of the coffee dispenser, wherein the computer controls the heater to adjust a water temperature based on the selected froth level.

11. The dispenser of claim 9, wherein the first fluid communication line comprises tubing or piping and the second fluid communication line comprises tubing or piping.

* * * * *